US010332090B2

(12) United States Patent
Stewart (10) Patent No.: US 10,332,090 B2
(45) Date of Patent: Jun. 25, 2019

(54) PROVIDING SECURE REMOTE ACCESS TO A DEVICE AT A MERCHANT LOCATION

(71) Applicant: ACUMERA, INC., Austin, TX (US)

(72) Inventor: Brett B. Stewart, Austin, TX (US)

(73) Assignee: Acumera, Inc., Austin, TX (US)

( * ) Notice: Subject to any disclaimer, the term of this patent is extended or adjusted under 35 U.S.C. 154(b) by 266 days.

(21) Appl. No.: 15/247,372

(22) Filed: Aug. 25, 2016

(65) Prior Publication Data

US 2017/0061415 A1 Mar. 2, 2017

Related U.S. Application Data

(60) Provisional application No. 62/210,862, filed on Aug. 27, 2015.

(51) Int. Cl.
*G06Q 20/20* (2012.01)
*H04L 29/06* (2006.01)

(52) U.S. Cl.
CPC ....... *G06Q 20/206* (2013.01); *H04L 63/0272* (2013.01)

(58) Field of Classification Search
USPC .......................................................... 705/18
See application file for complete search history.

(56) References Cited

U.S. PATENT DOCUMENTS

| | | |
|---|---|---|
| 5,898,594 A | 4/1999 | Leason |
| 5,950,437 A | 9/1999 | Turner |
| 6,052,629 A | 4/2000 | Leatherman |
| 6,089,146 A | 7/2000 | Nam |
| 6,152,591 A | 11/2000 | McCall |
| 6,225,908 B1 | 5/2001 | Lee |
| 6,351,689 B1 | 2/2002 | Carr |
| 6,523,744 B2 | 2/2003 | Royal |
| 6,555,789 B2 | 4/2003 | Owens |
| 6,859,745 B2 | 2/2005 | Carr |
| 6,970,100 B2 | 11/2005 | Lovegreen |
| 7,034,689 B2 | 4/2006 | Teplitxky |
| 7,155,405 B2 | 12/2006 | Petrovich |

(Continued)

OTHER PUBLICATIONS

U.S. Appl. No. 12/425,870, filed Apr. 17, 2009, inventors Brett B. Stewart and Charles D. Golson.

*Primary Examiner* — Garcia Ade
(74) *Attorney, Agent, or Firm* — Meyertons Hood Kivlin Kowert & Goetzel, P.C.; Jeffrey C. Hood (57) ABSTRACT

System and method for providing secure connections between a point of sale (POS) system and a datacenter. Upon initiation of a support event associated with the POS system, a gateway device may determine an available block of internet protocol (IP) addresses for the merchant location, e.g., by accessing information stored in a shared storage location. The gateway device may determine a local IP address of the POS system and establish an apparent IP address of the POS system, selected from the available block of IP addresses. The gateway device may initiate a virtual private network (VPN) tunnel to the datacenter using at least a subset of the available block of IP addresses. The gateway device may securely store a descriptive document in the shared storage location identifying the available block of IP addresses for the merchant location. The gateway device may performing IP address translation during the support event.

20 Claims, 5 Drawing Sheets

(56) References Cited

U.S. PATENT DOCUMENTS

| | | | |
|---|---|---|---|
| 7,225,253 B2 | 5/2007 | Ofir | |
| 7,551,071 B2 | 6/2009 | Bennett | |
| 7,694,005 B2 | 4/2010 | Reckamp | |
| 7,724,154 B2 | 5/2010 | Stewart | |
| 8,099,332 B2 | 1/2012 | Lemay | |
| 8,166,106 B2 | 4/2012 | Biggs | |
| 8,190,275 B2 | 5/2012 | Chang | |
| 8,205,240 B2 | 6/2012 | Ansari | |
| 8,219,558 B1 | 7/2012 | Trandal | |
| 8,234,692 B2 | 7/2012 | Cortes | |
| 8,239,772 B2 | 8/2012 | Fujioka | |
| 8,285,681 B2 | 10/2012 | Prahlad | |
| 8,301,270 B2 | 10/2012 | Quail | |
| 8,369,326 B2 | 2/2013 | Ansari | |
| 8,369,362 B2 * | 2/2013 | Abou-Chakra | H04L 29/06 370/503 |
| 8,516,477 B1 | 8/2013 | Kearns | |
| 8,782,637 B2 | 7/2014 | Khalid | |
| 2002/0040564 A1 | 4/2002 | Killingbeck | |
| 2002/0046185 A1 | 4/2002 | Villart | |
| 2002/0051463 A1 | 5/2002 | Higuchi | |
| 2002/0077889 A1 | 6/2002 | Kolls | |
| 2002/0099607 A1 | 7/2002 | Sosa | |
| 2002/0107791 A1 | 8/2002 | Nobrega | |
| 2003/0101262 A1 | 5/2003 | Godwin | |
| 2003/0137991 A1 | 7/2003 | Doshi | |
| 2003/0229546 A1 | 12/2003 | Ho | |
| 2005/0248455 A1 | 11/2005 | Pope | |
| 2005/0258961 A1 | 11/2005 | Kimball | |
| 2006/0033630 A1 | 2/2006 | Lyall | |
| 2006/0067209 A1 | 3/2006 | Sheehan | |
| 2006/0089965 A1 | 4/2006 | Fontes | |
| 2006/0122852 A1 | 6/2006 | Moudy | |
| 2006/0164239 A1 | 7/2006 | Loda | |
| 2006/0214788 A1 | 9/2006 | Ku | |
| 2006/0237528 A1 | 10/2006 | Bishop | |
| 2007/0185991 A1 | 8/2007 | Ofir | |
| 2008/0165789 A1 * | 7/2008 | Ansari | G06Q 30/04 370/401 |
| 2009/0019535 A1 | 1/2009 | Mishra | |
| 2009/0138958 A1 | 5/2009 | Baum | |
| 2009/0168787 A1 | 7/2009 | Ansari | |
| 2010/0023865 A1 | 1/2010 | Fulker | |
| 2010/0058319 A1 | 3/2010 | Kawaguchi | |
| 2010/0241502 A1 | 9/2010 | Walker | |
| 2010/0245107 A1 | 9/2010 | Fulker | |
| 2011/0126197 A1 | 5/2011 | Larsen | |
| 2011/0126255 A1 | 5/2011 | Perlman | |
| 2011/0251992 A1 | 10/2011 | Bethlehem | |
| 2012/0209947 A1 | 8/2012 | Glaser | |
| 2014/0047107 A1 * | 2/2014 | Maturana | H04L 43/04 709/224 |

\* cited by examiner

| VLAN TAG | MG ADDRESS | DHCP POOL | Purpose |
|---|---|---|---|
| 100 | 172.29.0.254/24 | not set | POS |
| 101 | 172.29.1.254/24 | not set | Fusion / Payment |
| 102 | 172.29.2.254/24 | not set | Media Gateway |
| 103 | 172.29.3.254/24 | not set | BOS |
| 104 | varies | varies | MOC/Loyalty Payment |

Fig. 4A

| Oracle ID | Apparent Address | Status | Start Time | Stop Time |
|---|---|---|---|---|
| 6004 | 100.64.0.0 | Active | 12:05 EDT | 14:05 EDT |
| 6031 | 100.64.4.0 | Closed | 11:05 EDT | 11:20 EDT |
| 702 | 100.64.8.0 | Active | 10:50 EDT | 12:50 EDT |
| 7270 | 100.64.12.0 | Active | 11:37 EDT | 13:37 EDT |

PROVIDING SECURE REMOTE ACCESS TO A DEVICE AT A MERCHANT LOCATION

PRIORITY INFORMATION

This application claims benefit of priority of U.S. provisional application Ser. No. 62/210,862 titled "Remote Access Interface and Use" filed Aug. 27, 2015, whose inventor was Brett B. Stewart, which is hereby incorporated by reference in its entirety as though fully and completely set forth herein.

FIELD OF THE INVENTION

This disclosure is directed to a gateway device, which provides for secure access to a device, such as a point of sale (POS) system.

DESCRIPTION OF THE RELATED ART

With the rapid development of the "Internet of Things" (IOT), where electronic devices are increasingly interconnected via networks, there has been an increase in threats to security, e.g., by criminal or malicious persons or software. More particularly, networked devices, such as point of sale (POS) systems, on merchant premises are vulnerable to electronic theft of data, e.g., customer records, payment information such as credit card numbers, via the network.

Prior art systems typically utilize persistent network connections that are always available for remote support by a third party vendor of a POS or similar system. Such persistent connections may present network security vulnerabilities, because they can be accessed at any time, rather than during the limited duration of a remote support event.

Accordingly, improved systems and methods for secure remote access to networked POS and similar systems are desired.

SUMMARY OF THE INVENTION

Systems and methods for providing for secure access to point of sale (POS) systems are presented.

Upon initiation of a support event associated with the POS system, a gateway device may determine an available block of interne protocol (IP) addresses for the merchant location, e.g., by accessing information stored in a shared storage location.

The gateway device may determine a local IP address of the POS system and establish an apparent IP address of the POS system, selected from the available block of IP addresses.

The gateway device may initiate a virtual private network (VPN) tunnel to the datacenter using at least a subset of the available block of IP addresses.

The gateway device may securely store a descriptive document in the shared storage location identifying the available block of IP addresses for the merchant location.

The gateway device may performing IP address translation during the support event.

The gateway device may terminate the support event, e.g., after a period of inactivity.

BRIEF DESCRIPTION OF THE DRAWINGS

Advantages of the present invention will become apparent to those skilled in the art with the benefit of the following detailed description and upon reference to the accompanying drawings in which.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

Terms

The following is a glossary of terms used in the present application:

Computer System—any of various types of computing or processing systems, including a personal computer system (PC), mainframe computer system, workstation, network appliance, Internet appliance, gateway device, personal digital assistant (PDA), television system, grid computing system, or other device or combinations of devices. In general, the term "computer system" can be broadly defined to encompass any device (or combination of devices) having at least one processor or functional unit that executes instructions from a memory medium.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors or functional units, as well as any combinations thereof. Note that memory in such systems may be integrated into the functional unit or coupled thereto.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system)

analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Internet Protocol (IP)—refers to the networking model and a set of protocols for communication used for networks such as the Internet.

Transmission Control Protocol (TCP)—refers to a core protocol of the internet protocol suite and provides delivery of a stream of octets between programs running on computers connected to a local area network, intranet, or the public Internet.

Ethernet—refers to a family of computer networking technologies for local area networks (LANs) as standardized in IEEE 802.3.

Local Area Network (LAN)—refers to a computer network that interconnects computers in a limited geographical area such as an office building or office complex.

Virtual Local Area Network (VLAN)—refers to a computer network that is logically segmented on an organizational basis, in other words, segmentation is based on functions or applications rather than on a physical or geographic basis as is the case with LANs.

Overview

Below are described embodiments of systems and methods for providing secure connections between a point of sale (POS) system and a datacenter. For example, embodiments of the devices and techniques disclosed herein may facilitate a process running in a third party resource (e.g., device) to securely request information regarding multiple simultaneous remote access connections to POS systems or other devices at merchant premises connected via a gateway device configured to implement embodiments of the novel techniques disclosed herein.

In the following description, numerous specific details are set forth to provide a thorough understanding of the present invention. However, one having ordinary skill in the art should recognize that the invention may be practiced without these specific details. In some instances, well-known structures and techniques have not been shown in detail to avoid obscuring the present invention.

Figure 1:
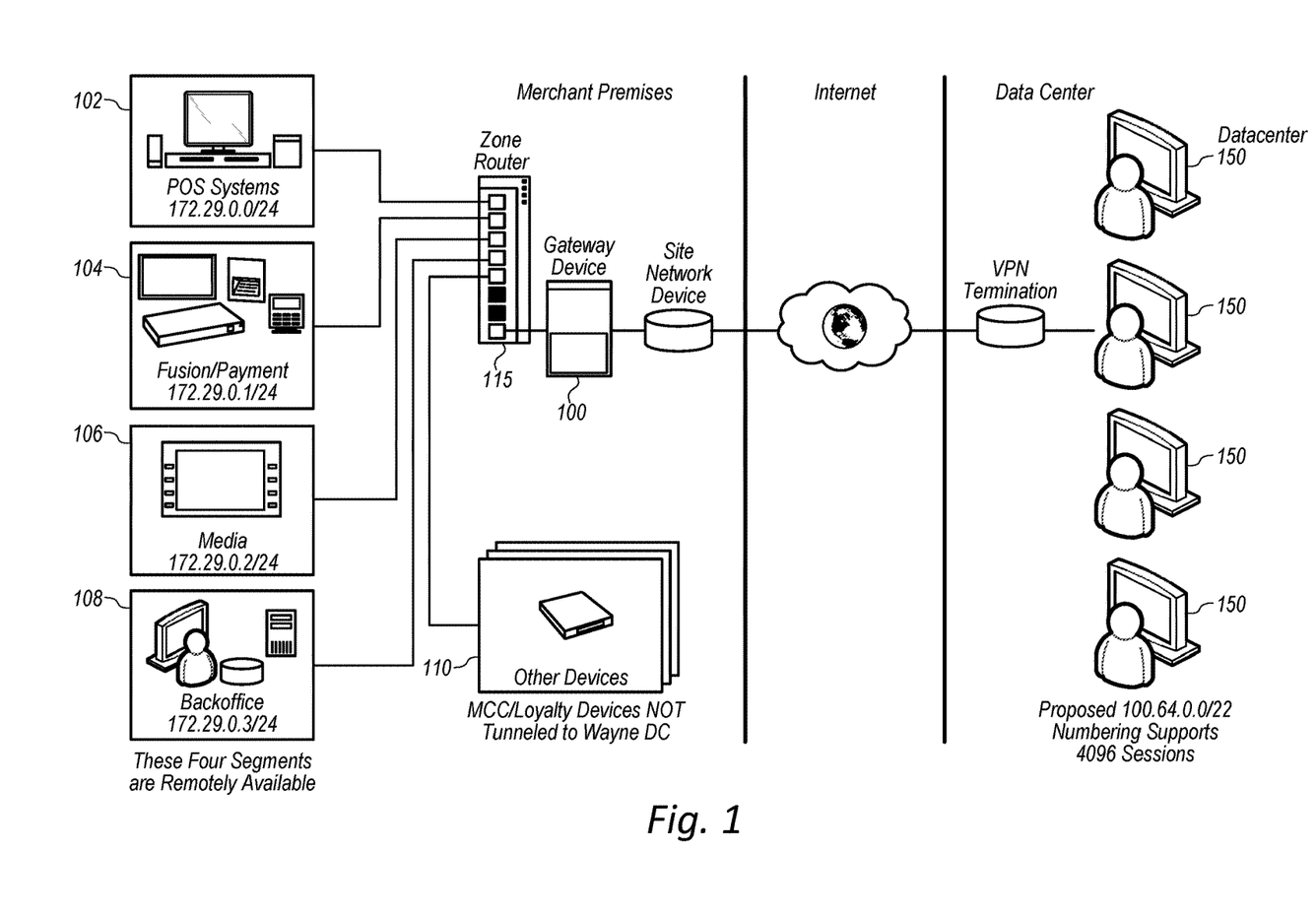
FIG. 1 is an illustration of an exemplary networked system, according to one embodiment.

FIG. 1—Exemplary Networked System

FIG. 1 illustrates an exemplary networked system, according to one embodiment. As may be seen, this exemplary system includes a gateway device 100 located at a merchant premises according to embodiments of the present techniques. The gateway device 100 is connected to various devices, such as point of sale (POS) systems 102, payment systems 104, media devices 106, back office 108, and other devices 110, via zone router 115. The zone router may operate to segregate the various different devices into different IP address ranges. For example, POS systems 102 may be segregated to IP addresses 172.29.0.0-172.29.0.255, payment systems 104 may be segregated to IP addresses 172.29.1.0-172.29.1.255, media 106 may be segregated to IP addresses 172.29.2.0-172.29.2.255, and backoffice 108 may be segregated to IP addresses 172.29.3.0-172.29.3.255. In some embodiments, these different sets of devices may be prevented from communicating with each other by the zone router 115 and/or the gateway device 100 for security reasons. Additionally, as discussed below, these sets of devices 102-108 may be accessible from datacenter 150, e.g., to perform support events.

Other devices 110 may also be coupled to the gateway device 100 via the zone router 115. In some embodiments, these other devices 110 may not be accessed from the datacenter 150 (e.g., for security reasons, as implemented by the gateway device 100 and/or the zone router 115, among other possibilities).

The gateway device 100 may communicate with the datacenter 150 over a network, such as the Internet. In some embodiments, the gateway device may establish a virtual private network (VPN) tunnel to the datacenter 150 using an available block of IP addresses, as discussed in more detail below. Although not shown, as discussed below, the gateway device and the datacenter may both couple to a secure shared storage location (e.g., Amazon S3™ or another cloud service), which may allow for storage of a descriptive document during a support event.

The POS systems 102 may be any of various systems or devices. In one embodiment, one POS system 102 may be configured to provide payment services for credit cards or debit cards. For example, the POS system 102 may be provided at a gas station location, e.g., comprised in a gasoline dispenser or "gas pump". As noted above, such POS systems may be considered attractive hacking targets and may therefore benefit from the embodiments described herein. Similarly, while only a few different devices are shown coupled to the gateway device 100, a multitude of devices are envisioned. For example, for a merchant premises that is a gas station, the various devices coupled to and/or managed by the gateway device may include all manner of devices, such as gas dispensers, point of sale devices, refrigeration systems, drink dispensers, and/or other types of devices. For other merchant types, the variety of devices installed at those type of locations may be managed by the gateway device 100.

It should be noted that the system connection topology shown is exemplary only, and that other connection topologies may be used as desired. For example, while FIG. 1 only illustrates a single connection involving one gateway device 100 for a single location, there may be a plurality of merchant gateway devices 100 at different merchant premises locations, which may also connect to the datacenter 150. For example, an owner or services may have a plurality of different merchant premises locations (e.g., a plurality of different gas stations) and may subscribe to a service to manage those plurality of locations (e.g., manage the POS systems and/or other devices located at those locations). In one embodiment, the services may be provided via the gateway device 100 and/or the datacenter 150. For example, an owner or manager may be able to monitor and/or manage a plurality of devices at a plurality of associated locations by using an application or webpage associated with the service.

This service may be provided, e.g., by a vendor of the gateway device 100, to a plurality of different managers or owners, each having their own one or more locations, which has one or more associated devices, respectively.

Figure 2:
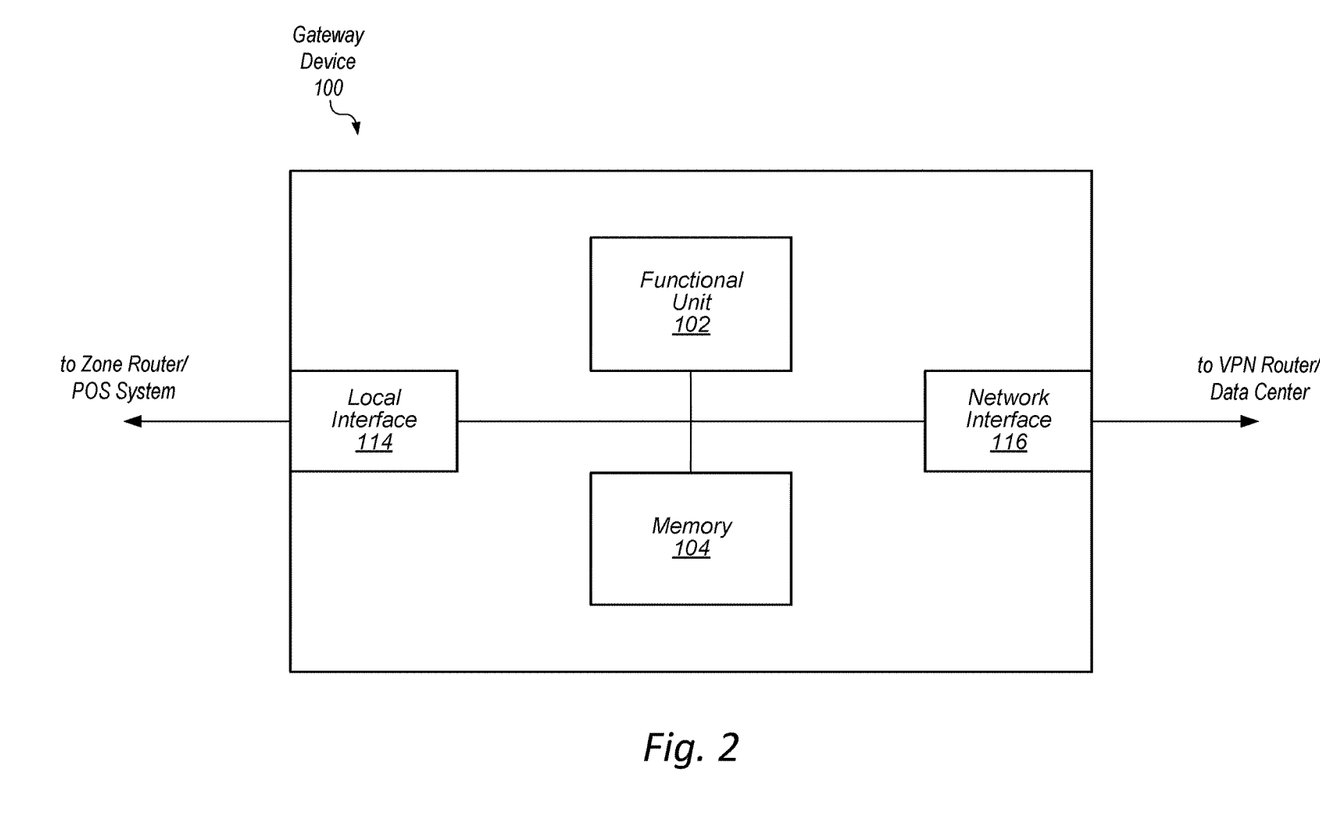
FIG. 2 is a high level block diagram of an exemplary gateway device, according to one embodiment.

FIG. 2—Exemplary Gateway Device

FIG. 2 is a high level block diagram of an exemplary gateway device 100, according to one embodiment. As FIG.

Figure 3:
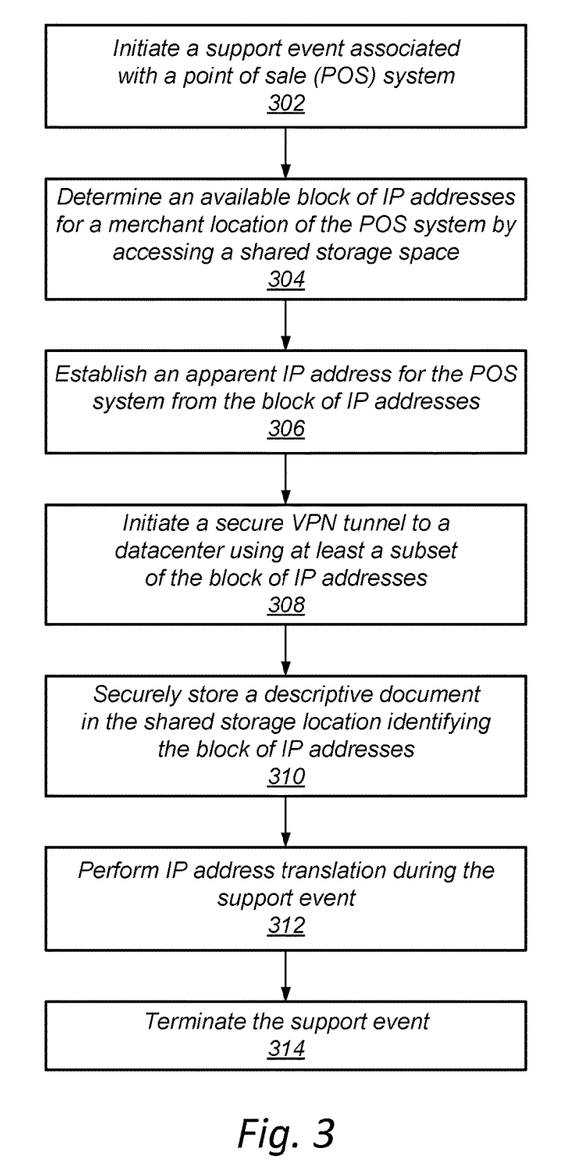
FIG. 3 is a high level flowchart diagram illustrating a method for providing secure access to a networked point of sale (POS) system, according to one embodiment.

2 shows, in this exemplary embodiment, the gateway device 100 includes a functional unit 102, a network interface 116, coupled to the functional unit 102, where the network interface is configured to communicate with a datacenter (e.g., datacenter 112 of FIG. 1) over a network (e.g., the Internet), and a memory 104 coupled to the functional unit, e.g., where the memory stores program instructions executable by the functional unit to implement embodiments of the novel techniques disclosed herein (see, e.g., the below method of FIG. 3). Note that in some embodiments, the memory 104 may be integrated into the functional unit.

The gateway device 100 may be configured to communicatively couple to the datacenter via a VPN, e.g., using a VPN router at the datacenter. As shown, in some embodiments, the gateway device 100 may also include a local interface 105 configured to connect to one or more devices, such as a POS system, e.g., of a merchant. Exemplary POS systems and datacenters include those provided by Gilbarco Inc., such as Passport® POS, Verifone Inc.'s Commander™ System, NCR's Radiant™ system and their respective support datacenters, but are not limited to the products and services of these particular vendors.

The gateway device 100 (or the functional unit 102 comprised within) may be configured to perform embodiments of the method of FIG. 3, now described.

FIG. 3—Providing Secure Access to a Network POS System

FIG. 3 is a high level flowchart diagram illustrating a method for providing secure access to a networked point of sale (POS) system. The method shown in FIG. 3 may be used in conjunction with any of the computer systems, devices, or embodiments of the present invention described above, and shown in the above described Figures, among other devices and embodiments. In one set of embodiments, the method may be performed in response to a support event, e.g., with respect to a POS system and/or associated datacenter. The method may be implemented or performed by a gateway device configured according to embodiments of the present techniques, such as described above with reference to FIGS. 1 and 2. In various embodiments, some of the method elements shown may be performed concurrently, in a different order than shown, or may be omitted. Additional method elements may also be performed as desired. As shown, this method may operate as follows.

In 302, a support event may be initiated for a POS system. The POS system may be similar to the POS systems 102, described above. For example, the POS system may be associated with a gas dispenser at a gas station, among other possibilities. Note that throughout the specification, various embodiments may refer to the POS system specifically, but these embodiments are also envisioned for other types of devices, e.g., managed by a gateway device at a premises.

Moreover, the support event may be any event involved in supporting the POS system. For example, the support event may be invoked in order to run diagnostics on the POS system, e.g., in order to troubleshoot a problem. For example, there may be a blockage in the gas dispenser system, the gas price may need to be updated, new media or advertisements may need to be updated for the system, a software update may need to be applied, etc. Thus, the support event may involve any of various tasks associated with the POS system.

In some embodiments, the support event may be invoked locally, e.g., by providing input to the POS system. For example, a local manager may provide input to start a troubleshooting process by selecting an option at the POS system. Alternatively, a person at the datacenter may remotely invoke the support event, e.g., by using a graphical user interface, such as a webpage at the support center.

However the support event is invoked, the method may involve receiving (e.g., at the gateway device) an indication of the support event, which may be provided from the POS system, from the datacenter, or from another source, as desired.

In 304, an available block of IP addresses may be determined for a merchant location of the POS system. In one embodiment, the available block of IP addresses may be determined by accessing a shared storage location, such as Amazon S3™ or some other cloud service. In particular, according to some embodiments, each time a support event is invoked for a merchant location, a block of IP addresses may be reserved for that merchant location. For example, following the IP address scheme discussed regarding FIG. 1 (although any type of address scheme is envisioned), a block of four sets of IP addresses may be reserved for the four different sets of devices 102, 104, 106, and 108.

In one embodiment, the method (e.g., the gateway device) may access the shared storage device to determine which blocks of IP addresses are currently in use (e.g., for support events of other locations). For example, a descriptive document may be stored for each support event, which indicates the set of IP addresses in use for that support event. Accordingly, the method may determine an available block of IP addresses for the support event in 302. In fact, in one embodiment, the method may not need to access the descriptive documents themselves, but instead determine addresses in use. For example, each document may be stored in an address in the format: "https://s3.amazonaws.com/merchantname/0/6004". This format may indicate that store 6004 associated with the merchant "merchantname" is using block 0 (e.g., which may correspond to a set of IP addresses 100.64.0.0-100.64.3.255, although the initial two numbers may be any desired numbers). Thus by determining the set of addresses in use (e.g., 0-3 are in use), the method may determine that block 4 is available (corresponding to 100.64.12.0-100.64.15.255) for the support event. Accordingly, these addresses may be determined as available. Note that the set of addresses in use could be nonconsecutive (e.g., 0, 2, and 3), in which case the method (e.g., the gateway device) may then use address block 1.

By dynamically determining a set of available addresses in response to the support event, it is possible to use an address space that is smaller than the number of addresses needed to support every merchant location uniquely. For example, the merchant may own or manage 1,000 stores, but the available address space may only allow for 50 blocks of IP addresses. Accordingly, this dynamic assignment of blocks of IP addresses may allow all 1,000 stores to be addressed on an as-needed basis. Said another way, by using this dynamic assignment, the issue of having a number of possible merchant locations that exceeds the number of available blocks of IP addresses may be resolved.

In 306, an apparent IP address may be assigned or established for the POS system from the block of IP addresses determined in 304. More specifically, an IP address of the block of IP addresses may be assigned to the POS system. Note that the POS system may already have a local IP address, e.g., assigned at the merchant location. However, this apparent IP address may be the one used by the datacenter to communicate with the POS system during the support event.

In one embodiment, the apparent IP address may be assigned to the POS system according to an addressing scheme. The addressing scheme may allow for a static addressing system that is the same for each different merchant location. For example, POS system #1 may always be assigned the first address of the first set of addresses of the block of IP addresses. For example, if the block of addresses is 100.64.0.0-100.64.3.255, then POS system #1 may always be assigned 100.64.0.1. Similarly, if the block of addresses is 100.64.4.0-100.64.7.255, then POS system #1 may be assigned to 100.64.4.1. Thus, from the support center's perspective, a constant addressing scheme may be used for each block of addresses, allowing for a consistent referencing scheme for each different merchant location.

306 may also apply to other devices at the merchant location. For example, POS system #2 may be assigned the second address in the block, e.g., 172.29.0.2. Other devices in other sets may be assigned to the second set. For example, payment system #1 may be assigned to 100.64.1.1, media device #1 may be assigned to 100.64.2.1, etc. Thus, in one embodiment, in 306, all of the managed devices at the location may be mapped to respective apparent IP addresses of the determined block of IP addresses according to the addressing scheme.

In 308, a secure virtual private network (VPN) tunnel from the gateway device to a VPN router at the datacenter may be initiated (or established), e.g., by the gateway device. The VPN tunnel may use the block of addresses determined in 304. At least a subset of this block of addresses may be assigned to the apparent addresses of device(s) of the location, as discussed in 306.

In 310, a descriptive document may be securely stored in the shared storage location, e.g., a networked storage device, where the descriptive document enables automatic secure connections from the datacenter to the gateway device and associated device (e.g., the POS system). The descriptive document may be placed in the shared storage location upon activation of a secure remote access connection, e.g., within a few seconds.

In some embodiments, the descriptive document may be writable only by a vendor of the gateway device, and may be securely readable over the network by a vendor of the datacenter via use of a cryptographic key provided to the vendor of the POS system/datacenter by the vendor of the gateway device. Alternatively or additionally, the descriptive document may be accessible only by the gateway device, and is securely readable over the network by a process or person at a datacenter via use of a shared cryptographic key.

In one embodiment, the descriptive document may use the addressing scheme discussed above in 304. Regardless of the specific address, the document may store various information concerning the support event. For example, the document may indicate which set of addresses are being used for the event, e.g., by identifying the address block number, or any other mechanism. The document may provide other information, such as an identification number of the location, an ID associated with the requestor, a phone number associated with the requestor, a status field, a start time, an ending time, an apparent address of the POS system, etc.

In one embodiment, the descriptive document may be used by the datacenter to determine which addresses should be used for the support event. More specifically, the descriptive document may enable the datacenter to communicate with the POS system using the apparent IP address during the support event. Note that while the present embodiment involves the method (e.g., the gateway device) determining and establishing the block of IP addresses, it is possible that this determination could be performed by the datacenter and the gateway device may be notified of that determination upon receiving an indication of the support event.

In 312, the method (e.g., the gateway device) may perform IP address translation during the support event. For example, the POS system may have a local address of 172.29.0.1 but may have an apparent address of 100.64.0.1. Thus, the gateway device may translate message received from the datacenter and addressed to 100.64.0.1 to the local IP address of 172.29.0.1. Similarly, the gateway device may label outgoing message from the POS system as from 100.64.0.1 instead of 172.29.0.1.

Finally, in 314, the support event may be terminated. Termination may happen in a variety of manners. For example, the datacenter may provide a message requesting termination of the support event (e.g., in response to user input at the data center) and the gateway device may terminate support event, e.g., releasing the VPN and block of IP addresses. Alternatively, or additionally, the support event may be terminated based on local input to the POS system.

In some embodiments, the method may involve automatic termination of the support event, e.g., ensuring that a persistent connection that is vulnerable to hacking is avoided. For example, the support event may be automatically terminated after a specified period of time after initiation of the support event (e.g., 2 hours, although other times could be used, such as 1 hour, 0.5 hours, 4 hours, etc.). Alternatively, or additionally, the support event may be automatically terminated after a period of inactivity (e.g., 10 minutes, 30 minutes, 1 hour, etc.).

Moreover, in some embodiments, the gateway device may be configured such that remote access may only be initiated by action of merchant personnel, e.g., by users of the POS system, or other employees of the merchant, consistent with PCI DSS section 12.3.9. Thus, remote access may be terminated by merchant personnel action at any time, consistent with PCI DSS section 12.3.9, and may also be terminated after the expiry of a specific period of inactivity. Thus, all secure connections are non-persistent, and thus not vulnerable to misuse.

In one embodiment, a management dashboard (program) may be provided by the vendor of the gateway device to the merchant, whereby secure remote access connections as described herein may be initiated or invoked.

Figure 4A:
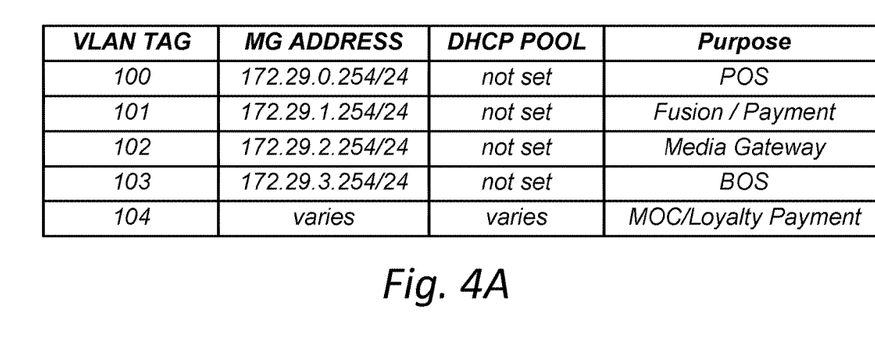
FIGS. 4A, 4B, and 5 illustrate an exemplary set of activated secure remote access connections, according to one embodiment.
Figure 4B:
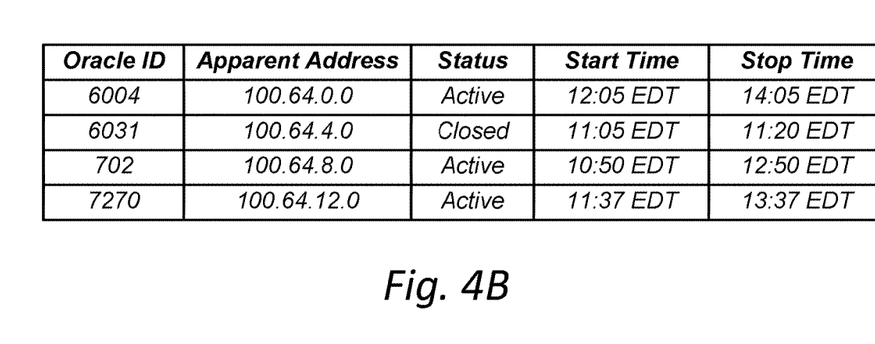
Figure 5:
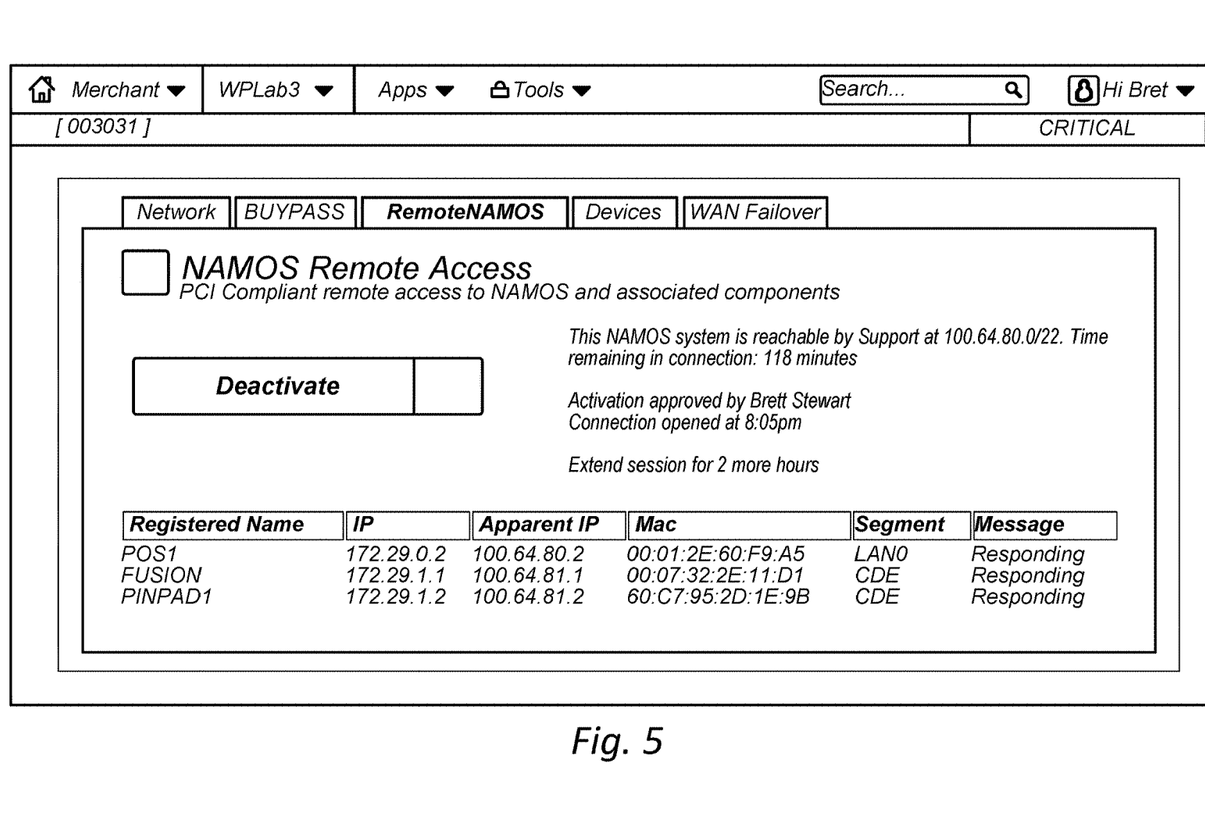

FIGS. 4A, 4B, and 5—Exemplary Connections

FIG. 4A illustrates an exemplary table illustrating a local address scheme, e.g., assigned at the merchant location, similar to the one discussed above regarding FIG. 1. In particular, address space 172.29.0.xxx is assigned for POS systems, 172.29.1.xxx is assigned for fusion/payment systems, 172.29.2.xxx is assigned for media gateway systems, and 172.29.3.xxx is assigned for back office systems. Various other devices (e.g., MOC/loyalty payment systems) may have a variable address scheme.

FIG. 4B illustrates an exemplary support status screen. In this example, four different merchant locations (having IDs: 6004, 6031, 702, and 7270) have corresponding descriptive documents stored in the shared storage space. Location 6004 uses the '0' address block (from 100.64.0.0-100.64.3.255), location 6031 used the '1' address block (from 100.64.4.0-100.64.7.255), location 702 uses the '2' address block, and location 7270 uses the '3' address block. Each of these supports has a status, a start time, and an end time. The support event associated with 6031 is closed, having started at 11:05 EDT and ended at 11:20 EDT. The remaining support events are still active with respective start times. Each of these has a stop time that is two hours after the start time (e.g., for automatic termination). Note that the automatic termination at that stop time may occur regardless of activity and/or may be performed only if the support event has been inactive for a period of time (e.g., 5 minutes, 10 minutes, 30 minutes, etc.).

Note that in some embodiments, each connection and its status may be reflected by status documents in Javascript™ Object Notation (JSON) in secure shared storage.

For example, exemplary document contents of the status document for the first connection may be:

```
{
"merchant": "xxxxx",
"store_name": "6004",
"requestor_id": "brett.stewart@acumera.net",
"requestor_phone": "512555555",
"vendor_id": "Unique_ ID_Specified_By_Vendor",
"apparent_address": "100.64.0.0",
"status": "active",
"start_time": "150803120500",
"stop_time": "150803140500"
}
```

In this particular exemplary embodiment, merchants are represented by unique 5-character codes (as denoted by "xxxxx" in FIG. 4B), store names may be represented by the nomenclature chosen by the merchant to identify the store. Additionally, in some embodiments, a unique ID, or other information, may be included in these documents.

Moreover, in one embodiment, closed connection status documents may be automatically removed from the shared storage some specified time, e.g., four hours, after the connection is closed. These descriptive documents may be referred to as "status documents".

In some embodiments, the status (or descriptive) documents may be available to the vendor of the POS system/datacenter via a simple storage service, such as Amazon.com Inc.'s Simple Storage Service (S3), e.g., in a suitably named "bucket", e.g., "POS_remote_access", as S3 is PCI DSS 3.1 compliant. Moreover, attestations of compliance and responsibility matrices to that effect may be available from Amazon Web Services.

FIG. 5 illustrates an exemplary interface that may be used to perform a support event. For example, a user at the datacenter (or using a webpage connected to the datacenter) may select an "activate" button, which may initiate the support event (and change its status to "deactivate" as shown). As shown, the time remaining in the connection is 118 minutes. Additionally, the activation was approved by Brett Stewart at 8:05 pm. There is also the possibility to extend the session for two more hours.

The table at the bottom of the Figure shows various devices at the location. In particular, POS #1 has an IP address of 172.29.0.2 as well as an apparent IP address of 100.64.80.2. This device is within the LANO segment of the block of addresses, has a particular MAC address, and has a status of "responding". Devices FUSION and PINPAD1 have IP addresses of 172.29.1.1 and 172.29.1.2 with corresponding apparent IP addresses of 100.64.81.1 and 100.64.81.2. Both of these devices are within the CDE segment of the block of addresses and have a status of "responding".

Note that while various IP addressing schemes are discussed for implementing the "apparent" IP address for these support events, they may be transparent to users. For example, rather than displaying these apparent addresses (and/or requiring users to specify these apparent addresses), the user interface could simply display labels for the various devices (e.g., POS #1, Media #1, etc.) and transparently use the apparent IP addresses discussed herein.

In one embodiment, the user may terminate the support event by selecting the "deactivate" sliding button.

Compliance

The gateway device may be configured to comply with PCI DSS (Payment Card Industry Data Security Standard) 3.1 Requirements, including these particular sections:

12.3.9 Activation of remote-access technologies for vendors and business partners only when needed by vendors and business partners, with immediate deactivation after use; and 12.3.8 Automatic disconnect of sessions for remote-access technologies after a specific period of inactivity.

Additionally, the VPN may be configured to comply with the requirements:

4.1 Use strong cryptography and security protocols to safeguard sensitive cardholder data during transmission over open, public networks, including the following: only trusted keys and certificates are accepted, the protocol in use only supports secure versions or configuration, the encryption strength is appropriate for the encryption methodology in use.

In one embodiment, operations may conform to best practices for VPNs according to the NIST SP800 series of documents. For example, the methods may comply with mandatory encryption, AES256 in Galois Counter Mode, HMAC SHA256, Security Association Lifetime of 86400 seconds, ReKey Interval of 28800 seconds, Diffie-Helman Key Exchange in Group 14 or 24 (modp 2048), Pre-Shared Key Lifetime not to exceed one year.

Other Devices

While many of the present embodiments focus on support events associated with POS systems, they may also apply to any of a variety of devices. For example, in some embodiments, the methods discussed herein may be applied to any system containing sensitive personal or financial information. Even further, the method may apply to any device, e.g., such as one or more located at a remote location managed by a gateway device.

Although the embodiments above have been described in considerable detail, numerous variations and modifications will become apparent to those skilled in the art once the above disclosure is fully appreciated. It is intended that the following claims be interpreted to embrace all such variations and modifications. Other embodiments may include various modifications and alterations that still fall within the scope of the contemplated embodiments. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. The words "include", "including", and "includes" mean including, but not limited to. As used herein, the singular forms "a", "an" and "the" include plural referents unless the content clearly indicates otherwise. Thus, for example, reference to "a device" includes a combination of two or more devices.

I claim:

1. A gateway device for providing secure connections between a point of sale (POS) system located at a merchant location and a datacenter, the gateway device comprising:
a functional unit coupled to a network interface, wherein the network interface is configured to communicate with the datacenter over a network;
wherein the functional unit is configured to:
upon initiation of a support event associated with the POS system, determine an available block of internet protocol (IP) addresses for the merchant location, wherein determining the available block of IP addresses is performed by accessing information stored in a shared storage location;
determine a local IP address of the POS system;
establish an apparent IP address of the POS system that is different than the local IP address, wherein the apparent IP address is selected from the available block of IP addresses;
initiate a secure virtual private network (VPN) tunnel from the gateway device to the datacenter, wherein the VPN tunnel uses at least a subset of the available block of IP addresses;
securely store a descriptive document in the shared storage location, wherein the descriptive document identifies the available block of IP addresses for the merchant location, and wherein the descriptive document is configured to enable the datacenter to communicate with the POS system using the apparent IP address during the support event;
during the support event, receive one or more communications from the data center addressed to the apparent IP address and translate the received one or more communications to be addressed to the local IP address; and
terminate the support event.

2. The gateway device of claim 1, wherein the merchant location comprises a plurality of devices, wherein the functional unit is further configured to establish an apparent IP address for each of the plurality of devices, wherein each apparent IP address is selected from the available block of IP addresses.

3. The gateway device of claim 1, wherein determining the available block of addresses comprises:
accessing one or more descriptive documents stored in the shared storage location, wherein each of the one or more descriptive documents identifies a respective block of IP addresses in use; and
determining an unused block of IP addresses different from each of the respective blocks of IP addresses in use.

4. The gateway device of claim 3, wherein each respective block of IP addresses in use are associated with a respective merchant location, wherein the number of possible merchant locations exceeds the number of available blocks of IP addresses.

5. The gateway device of claim 1, wherein the descriptive document is accessible only by the gateway device, and is securely readable over the network by the datacenter via use of a shared cryptographic key.

6. The gateway device of claim 1, wherein said terminating the support event is performed automatically in response to a specified period of inactivity.

7. The gateway device of claim 1, wherein said terminating the support event is performed in response to:
termination of the support event;
a command from the POS system; or
a command from the datacenter.

8. The gateway device of claim 1, wherein the initiation of the support event is performed in response to:
input to the POS system; or
a command from the datacenter.

9. A method for providing secure connections between a point of sale (POS) system located at a merchant location and a datacenter, the method comprising:
by a gateway device at the merchant location:
upon initiation of a support event associated with the POS system, determining an available block of internet protocol (IP) addresses for the merchant location, wherein determining the available block of IP addresses is performed by accessing information stored in a shared storage location;
determining a local IP address of the POS system;
establishing an apparent IP address of the POS system that is different than the local IP address, wherein the apparent IP address is selected from the available block of IP addresses;
initiating a secure virtual private network (VPN) tunnel from the gateway device to the datacenter, wherein the VPN tunnel uses at least a subset of the available block of IP addresses;
securely storing a descriptive document in the shared storage location, wherein the descriptive document identifies the available block of IP addresses for the merchant location, and wherein the descriptive document is configured to enable the datacenter to communicate with the POS system using the apparent IP address during the support event;
during the support event, receiving one or more communications from the data center addressed to the apparent IP address and translating the received one or more communications to be addressed to the local IP address; and
terminating the support event.

10. The method of claim 9, wherein the merchant location comprises a plurality of devices, wherein the functional unit is further configured to establish an apparent IP address for each of the plurality of devices, wherein each apparent IP address is selected from the available block of IP addresses.

11. The method of claim 9, wherein determining the available block of addresses comprises:
accessing one or more descriptive documents stored in the shared storage location, wherein each of the one or more descriptive documents identifies a respective block of IP addresses in use; and
determining an unused block of IP addresses different from each of the respective blocks of IP addresses in use.

12. The method of claim 11, wherein each respective block of IP addresses in use are associated with a respective merchant location, wherein the number of possible merchant locations exceeds the number of available blocks of IP addresses.

13. The method of claim 9, wherein the descriptive document is accessible only by the gateway device, and is securely readable over the network by the datacenter via use of a shared cryptographic key.

14. The method of claim 9, wherein said terminating the support event is performed automatically in response to a specified period of inactivity.

15. The method of claim 9, wherein said terminating the support event is performed in response to:

termination of the support event;
a command from the POS system; or
a command from the datacenter.

16. The method of claim 9, wherein the initiation of the support event is performed in response to:
input to the POS system; or
a command from the datacenter.

17. A non-transitory memory medium storing program instructions for providing secure connections between a point of sale (POS) system located at a merchant location and a datacenter, wherein the program instructions are executable by a processor of a gateway device at the merchant location to:
upon initiation of a support event associated with the POS system, determine an available block of internet protocol (IP) addresses for the merchant location, wherein determining the available block of IP addresses is performed by accessing information stored in a shared storage location;
determine a local IP address of the POS system;
establish an apparent IP address of the POS system that is different than the local IP address, wherein the apparent IP address is selected from the available block of IP addresses;
initiate a secure virtual private network (VPN) tunnel from the gateway device to the datacenter, wherein the VPN tunnel uses at least a subset of the available block of IP addresses;
securely store a descriptive document in the shared storage location, wherein the descriptive document identifies the available block of IP addresses for the merchant location, and wherein the descriptive document is configured to enable the datacenter to communicate with the POS system using the apparent IP address during the support event;
during the support event, receive one or more communications from the data center addressed to the apparent IP address and translate the received one or more communications to be addressed to the local IP address; and
terminate the support event.

18. The non-transitory memory medium of claim 17, wherein determining the available block of addresses comprises:
accessing one or more descriptive documents stored in the shared storage location, wherein each of the one or more descriptive documents identifies a respective block of IP addresses in use; and
determining an unused block of IP addresses different from each of the respective blocks of IP addresses in use.

19. The non-transitory memory medium of claim 18, wherein each respective block of IP addresses in use are associated with a respective merchant location, wherein the number of possible merchant locations exceeds the number of available blocks of IP addresses.

20. The non-transitory memory medium of claim 17, wherein said terminating the support event is performed automatically in response to a specified period of inactivity.

* * * * *